(12) United States Patent
Hallale

(10) Patent No.: US 8,087,226 B2
(45) Date of Patent: Jan. 3, 2012

(54) DETENT SPRING ON ADJUSTMENT MECHANISM FOR REEL-TO-BEDKNIFE CLEARANCE

(75) Inventor: Sanjeev Hallale, Pune (IN)

(73) Assignee: Deere & Company, Moline, IL (US)

( * ) Notice: Subject to any disclaimer, the term of this patent is extended or adjusted under 35 U.S.C. 154(b) by 127 days.

(21) Appl. No.: 12/336,947

(22) Filed: Dec. 17, 2008

(65) Prior Publication Data

US 2010/0146923 A1    Jun. 17, 2010

(51) Int. Cl.
*A01D 34/53* (2006.01)
(52) U.S. Cl. .......................................... 56/249
(58) Field of Classification Search ............. 56/17.1, 56/17.2, 249, 251, 294, DIG. 16, DIG. 20
See application file for complete search history.

(56) References Cited

U.S. PATENT DOCUMENTS

| 1,720,471 | A | * | 7/1929 | Fritsch ........................ 24/11 S |
| 1,802,304 | A | | 4/1931 | Anderson |
| 3,680,293 | A | * | 8/1972 | Klemenhagen ................ 56/249 |
| 4,006,580 | A | * | 2/1977 | Kalleicher .................... 56/17.2 |
| 4,335,569 | A | * | 6/1982 | Keeney et al. ................ 56/249 |
| 4,644,737 | A | * | 2/1987 | Arnold .......................... 56/249 |
| 4,852,658 | A | * | 8/1989 | Wessel et al. ................. 172/14 |
| 6,044,637 | A | * | 4/2000 | Thier et al. ................... 56/249 |

FOREIGN PATENT DOCUMENTS

| DE | 2212884 | 9/1973 |
| GB | 516932 | 1/1940 |
| GB | 521527 | 5/1940 |
| WO | 92/12352 | 7/1992 |

* cited by examiner

*Primary Examiner* — Thomas Will
*Assistant Examiner* — Mai Nguyen

(57) ABSTRACT

An adjustment mechanism for reel-to-bedknife clearance includes an adjuster base having an internal bore, an adjustment knob attached to a rod extending through the internal bore to engage one of the reel or bedknife, and a detent spring captured between the adjuster base and the adjustment knob and biased against the adjustment member to resist rotation of the adjustment knob. The detent spring may engage radial notches on the adjustment knob at a plurality of reel-to-bedknife clearance positions.

18 Claims, 4 Drawing Sheets

US 8,087,226 B2

DETENT SPRING ON ADJUSTMENT MECHANISM FOR REEL-TO-BEDKNIFE CLEARANCE

FIELD OF THE INVENTION

This invention relates generally to reel mower cutting units, and specifically to an adjustment mechanism for reel-to-bedknife clearance on a grass mowing machine.

BACKGROUND OF THE INVENTION

Reel mower cutting units are grass mowing machines that are used on golf courses and other turf areas that require grass to be cut very accurately. The cutting units are typically rolled across the surface of the ground by a powered vehicle. These cutting units include a generally cylindrical reel that has a plurality of blades which rotate in close proximity to a bedknife fixed with the frame of the cutting unit. Grass is cut by a shearing action between the bedknife and the rotating blades of the reel. The height at which grass is cut can be adjusted by altering the height at which the cutting unit frame is positioned above the ground surface. The bedknife or reel may be routinely serviced and adjusted to be in proper position such that the grass is cut effectively. Reel mower cutting units provide adjustment mechanisms that allow an operator to adjust the clearance between the reel blades and bedknife.

In the past, some adjustment mechanisms for reel-to-bedknife clearance have included a threaded rod that has a lower end coupled with the bedknife. The rod is supported by a bracket fixed with the cutting unit frame. A nut is threaded onto the rod and is positioned above and in abutment with the bracket. The nut can be tightened or loosened to shift up or down along the rod. The rod is positioned within the coils of a compression spring which biases the rod downwardly for maintaining the nut firmly in abutment against the bracket. The rod shifts up or down with respect to the bracket and cutting unit frame as the nut is turned by the operator. Shifting of the rod causes the bedknife to shift up or down, which adjusts the position of the bedknife with respect to the reel blades. The spring, nut and bracket hold the rod and bedknife in the particular selected position. The spring also serves to take any slack or play out of the linkage that may exist in the connection between the rod and the bedknife, or between the nut, rod and bracket. Slack would allow the bedknife to shift during operation, which could negatively affect cut quality and could cause damage to the reel blades or bedknife if the bedknife shifted upwardly into the reel blades due to this slack. When the bedknife on this type of cutting unit strikes an obstruction the linkage mechanism may allow the bedknife to shift upwardly against the compressive force of the spring as the bedknife strikes the obstruction. When this occurs the bedknife may actually strike one of the rotating reel blades, which can cause undesirable damage or wear to the blade or bedknife.

Another reel-to-bedknife adjustment linkage includes a threaded rod that is coupled with the bedknife for altering the position of the bedknife. The rod is positioned within an opening in a bracket, and a pair of jam nuts are threaded onto the rod on either side of the bracket. These jam nuts can be adjusted to alter the position of the rod and thereby alter the position of the bedknife. Adjustments are made by setting the position of the rod by manipulating the nut on top of the bracket so that the bedknife is in the proper position, and then tightening the lower nut upwardly against the underside of the bracket. Tightening of the lower nut against the bracket can sometimes cause the bedknife to shift slightly from the position set by the upper nut, and can therefore undesirably shift the bedknife slightly from the desired position. Adjustment of the bedknife by the use of jam nuts can be a delicate and time consuming process. This type of adjustment linkage also can include a compression spring that will take slack out of the connection between the threaded rod and bedknife. Many such units do not provide compression springs that take up slack that may develop between the nuts, rod and bracket. Since the jam nuts positively set the position of the rod, the bedknife is generally blocked from shifting upwardly into or against the reel blades when the bedknife strikes an obstruction. This type of adjustment mechanism can be relatively difficult to assemble since the compression spring must be somehow held in a compressed fashion while the linkage is assembled.

Another reel-to-bedknife adjustment mechanism includes a double legged bracket which supports a threaded rod, and a compression spring that abuts one leg of the bracket for removing play from the linkage at both ends of the threaded rod. A nut positioned between the legs of the bracket can be tightened on the threaded rod for further compressing the compression spring to thereby remove the force of the spring from the linkage to allow the linkage to be easily swung out to a service position. This adjustment mechanism is shown in U.S. Pat. No. 6,044,637 assigned to Deere & Company.

Another reel-to-bedknife adjustment mechanism includes a screw adjustment device that can be rotated to tilt the bedknife with respect to the reel. A detent locks the screws and permits accurate incremental adjustment thereof. This mechanism is shown in U.S. Pat. No. 3,680,293 assigned to Toro Manufacturing Corp.

Other examples of reel-to-bedknife adjustment mechanisms are shown in U.S. Pat. No. 4,335,569 assigned to The Toro Company, and U.S. Pat. Nos. 4,606,178 and 4,637,204 assigned to Textron Inc.

Other reel-to-bedknife adjustment mechanisms are offered that an operator can use by turning a knob or wheel attached to a rod that changes the clearance. Some of these adjustment mechanisms may include a detent to help limit rotation of the knob or wheel. For example, The Toro Company offers a dual screw "click" adjustment for bedknife to reel adjustment, or a single hand-controlled knob located at the center of the bedbar. The adjustment knob contains a detent with 0.001 inch (0.025 mm) movement of the bedknife for each indexed position.

The detent on these reel-to-bedknife adjustment mechanisms may include a detent spring mounted to the base of the adjustment mechanism with a screw. The detent spring may engage notches or teeth around the outer circumference of the knob or wheel. However, the screw may become loose during mowing operations, and the screw and detent spring then may drop into the cutting unit or onto the ground. An adjustment mechanism is needed for reel-to-bedknife clearance that provides a detent without a screw for attaching the detent spring.

Additionally, a groove may be provided in the side surface of the adjuster base to help the detent spring stay in alignment with notches or teeth in the outer circumference of the adjuster knob or wheel. However, machining the groove into the side surface of the adjuster base is a costly operation. An adjustment mechanism is needed for reel-to-bedknife clearance that reduces the cost of machining parts.

SUMMARY OF THE INVENTION

An adjustment mechanism for reel-to-bedknife clearance includes a rotatable adjustment knob having a plurality of radially directed notches, a rod having a first end connected to the adjustment knob, and an adjuster base through which the rod extends. The adjuster base has a slot in a face thereof where a detent spring is mounted between and adjuster base and adjustment knob. The detent spring has an upturned end with a ridge that engages the notches at a plurality of different reel-to-bedknife clearance positions. The detent spring resists rotation of the adjustment knob.

The detent spring is held without a screw that could become loose during mowing operations and drop into the cutting unit or onto the ground. Additionally, a slot in the face of the adjuster base helps the detent spring stay in alignment with notches or teeth in the outer circumference of the adjuster knob or wheel, and reduces the cost of machining parts.

DESCRIPTION OF THE PREFERRED EMBODIMENT

Figure 1:
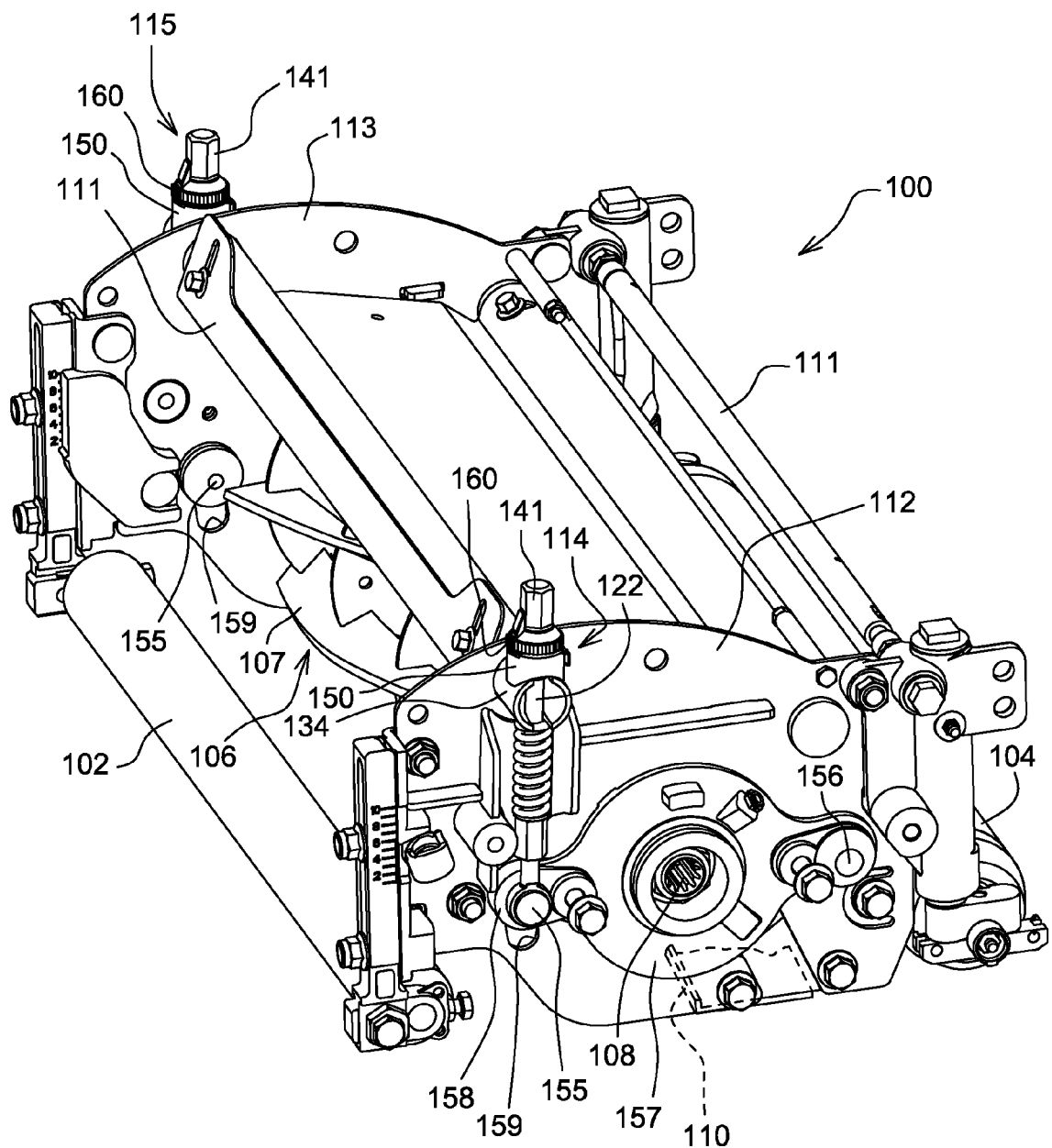
FIG. 1 is a perspective view of a reel mower cutting unit with an adjustment mechanism for reel-to-bedknife clearance according to a first embodiment of the invention.
Figure 2:
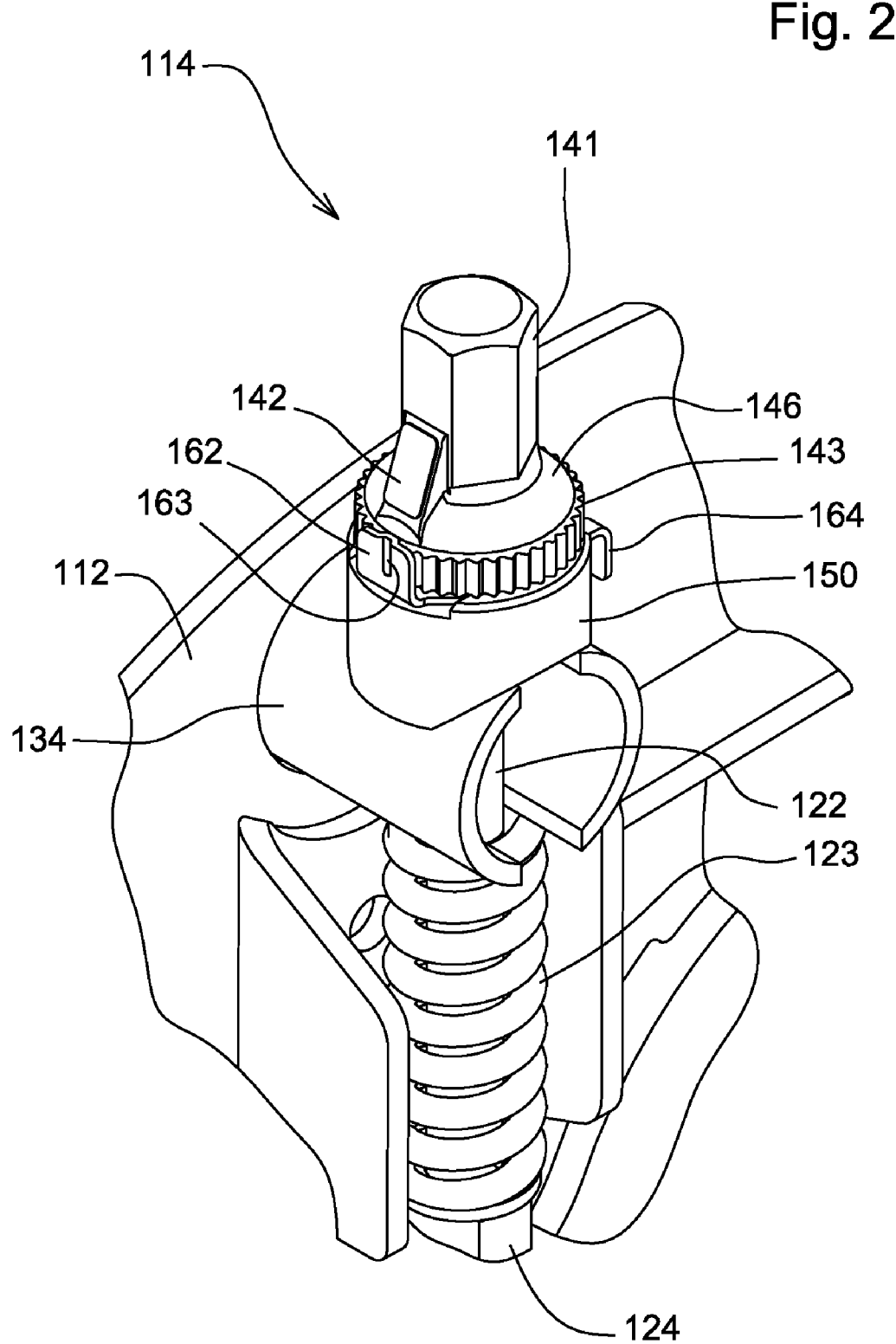
FIG. 2 is a perspective view of an adjustment mechanism for reel-to-bedknife clearance according to a first embodiment of the invention.
Figure 3:
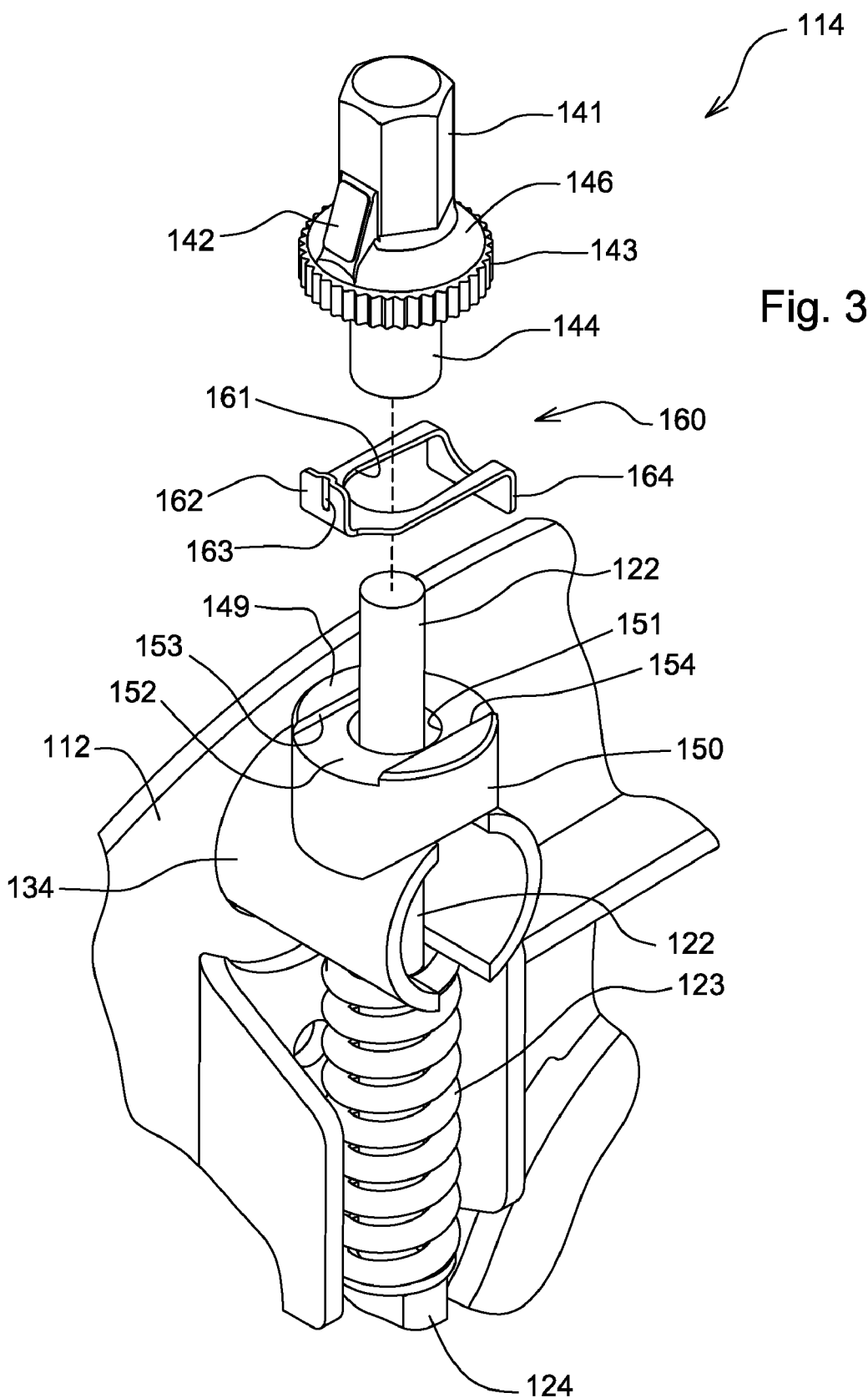
FIG. 3 is a partially exploded perspective view of an adjustment mechanism for reel-to-bedknife clearance according to a first embodiment of the invention.

In the embodiment shown in FIGS. 1-3, reel mower cutting unit 100 is shown with an adjustment mechanism for reel-to-bedknife clearance. Several reel mower cutting units may be mounted to a vehicle that is driven across the ground. Lift arms connected between the vehicle and the cutting units propel the cutting units along the ground. Each cutting unit may have front and rear rollers 102 and 104 that roll in contact with the ground and support the cutting unit during mowing operations. Each cutting unit includes a generally cylindrical reel 106 having a plurality of blades 107 that rotate about the reel's laterally extending central axis 108. The cylindrical reel may be rotated with an electric or hydraulic motor, for example. As the blades rotate they pass in close proximity to bedknife 110 that is positioned between left and right side panels 112, 113 of the cutting unit frame. The cutting unit frame also may include one or more cross bars 111 connecting the left and right side panels. The blades and bedknife interact to cut grass with a shearing action as the cutting unit is propelled forward.

In one embodiment, the reel mower cutting unit includes left and right adjustment mechanisms 114 and 115. The pair of adjustment mechanisms may be used to adjust the position of reel 106 with respect to the stationary bedknife 110 so that the shearing action can be fine tuned for providing a high quality cut. Additionally, the adjustment mechanisms may include detents that an operator may use to determine the specified reel-to-bedknife clearance.

In one embodiment, each adjustment mechanism 114, 115 includes rod 122, adjustment knob 141, and coil spring 123 around the rod or shaft between tube 134 and nut 124. The pair of adjustment mechanisms may be used to move the reel blades toward or away from the cutting edge of bedknife 110. The operator may make adjustments by manually rotating the adjustment knob to shift the rod along the rod's central axis. As the rod shifts along its central axis, this moves the reel blades toward or away from the cutting edge of bedknife 110.

In one embodiment, each adjustment knob 141 includes indexing tab 142, circumferential wheel portion 146 having notches or teeth 143 extending radially outwardly therefrom, and sleeve 144 where the first or upper end of rod 122 may be inserted and held, such as by mating threads. Each rod 122 may extend through an opening in tube 134. This tube may be positioned perpendicular to the rod and parallel to the central axis of the reel, extending between side panels 112 and 113.

In one embodiment, the second or lower end of rod 122 may be pivotally connected at 155 to an end of reel 106. For example, pivot point 155 can move up or down within slot 159 in side panel 112 of the cutting unit. Pivot point 155 may extend through plate 158 attached to collar 157 which is pivotally mounted to the side panel at pivot axis 156. The opposing ends of reel axis 108 may be mounted into collar 157.

In one embodiment, adjuster base 150 may be mounted onto tube 134 so that the adjuster base is oriented transversely to the tube axis. The adjuster base may be a generally cylindrical body having an internal bore 151 where sleeve 144 may be inserted. Slot 152 is located on the upper face 149 of adjuster base 150. Slot 152 may have a depth of about 3 mm to 10 mm below the upper face, with opposing and parallel walls 153-54.

In one embodiment, detent spring 160 is a one piece member, preferably sheet metal, that is sufficiently rigid to resist rotation of the circumferential wheel portion and secure the reel and/or bedknife at a specified reel-to-bedknife clearance position, unless the operator turns the adjustment knob. The detent spring also may be sufficiently flexible so that the operator can overcome the resistance to turn the adjustment knob manually or with a hand held tool. The detent spring fits within slot 152, and has an opening 161 where the first or upper end of rod 122 is inserted through. A first end 162 of the detent spring may be upturned at an angle of about ninety degrees. The first or upturned edge of the detent spring may have a ridge, dome or abutment 163 that can engage the knob between circumferential notches or teeth at various reel-to-bedknife clearance positions. The second end 164 of the detent spring may be downturned at an angle of about ninety degrees to provide a lip that extends over the edge of adjuster base 150 and helps maintain the detent spring at its specified location on the adjuster base.

Figure 4:
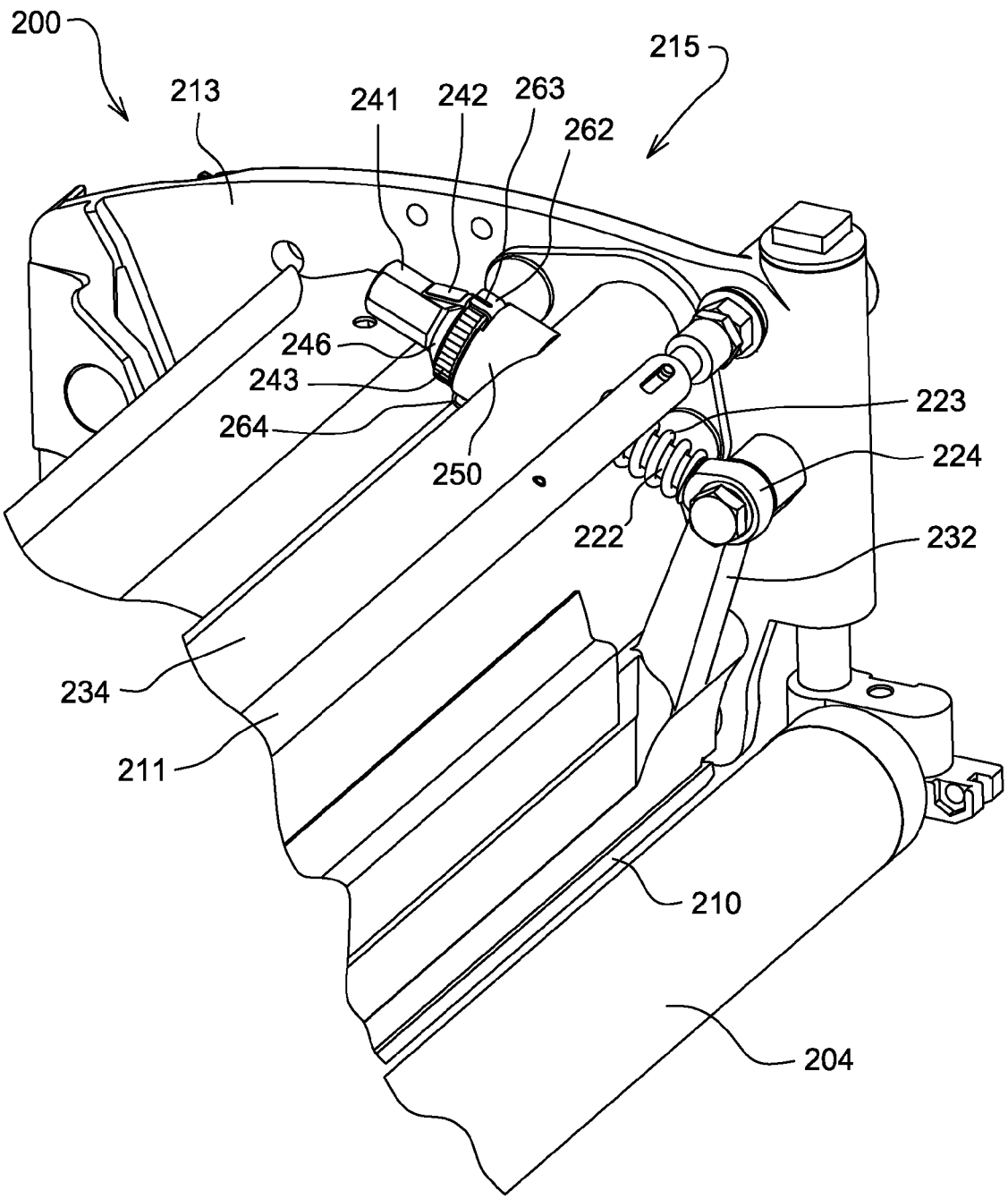
FIG. 4 is a perspective view of a portion of a reel mower cutting unit with an adjustment mechanism for reel-to-bedknife clearance according to a second embodiment of the invention.

In a second embodiment shown in FIG. 4, reel mower cutting unit 200 is shown with an adjustment mechanism for reel-to-bedknife clearance in which the bedknife moves and the cutting reel remains stationary. Cutting unit 200 may have a front roller (not shown) and a rear roller 204 in contact with the ground for supporting the cutting unit during mowing operations. The cutting unit includes a generally cylindrical reel having a plurality of blades that rotate about the reel's laterally extending central axis. Bedknife 210 is positioned between side panel 213 and an opposing side panel (not shown) of the cutting unit frame. The cutting unit frame also may include one or more cross bars 211 connecting the side panels. The blades and bedknife interact to cut grass with a shearing action as the cutting unit is propelled forward.

In a second embodiment, the reel mower cutting unit includes a pair of adjustment mechanisms. One of the adjustment mechanisms 215 is shown in FIG. 4. The pair of adjustment mechanisms may be used to adjust the position of bedknife 210 with respect to the reel blades so that the shearing action can be fine tuned for providing a high quality cut.

In one embodiment, adjustment mechanism 215 includes rod 222, adjustment knob 241, and coil spring 223 around the rod between tube 234 and pivot point 224. The coil spring applies an axial force on the rod tending to resist rotation of the adjustment member. Each adjustment mechanism may be used to move the cutting edge of bedknife 210 toward or away from the reel blades. The operator may do this by rotating the adjustment knob to shift the rod along the rod's central axis. As the rod shifts along its central axis, this moves the cutting edge of bedknife 110 toward or away from the reel blades. The second or rearward portion of each rod engages an upwardly extending arm 232 of a bedknife support at pivot point 224.

In a second embodiment, adjustment knob 241 includes indexing tab 242, and circumferential wheel portion 246 having notches or teeth 243 extending radially outwardly therefrom. The adjustment member may be attached to the first or upper end of rod 222 by mating threads or other means. The rod may extend through an opening in tube 234. The tube may be positioned perpendicular to the rod and parallel to the central axis of the reel, extending between the side panels.

In the second embodiment, adjuster base 250 may be mounted onto tube 234 so that the adjuster base is oriented transversely to the tube axis. The adjuster base may be a generally cylindrical body having an internal bore. A slot extends across the upper face of adjuster base 250, with a depth of about 3 mm to 10 mm below the upper face, and opposing and parallel side walls.

In the second embodiment, the detent spring may be a one piece member, preferably sheet metal, that is sufficiently rigid to resist rotation of the circumferential wheel portion and secure the reel and/or bedknife at a specified reel-to-bedknife clearance position, unless the operator turns the adjustment knob. The detent spring also should be sufficiently flexible so that the operator can overcome the resistance by turning the adjustment member. The detent spring fits within a slot in the face of the adjuster base, and has an opening that the first or upper end of rod 222 is inserted through. A first end 262 of the detent spring may be upturned at an angle of ninety degrees and has a ridge, dome or abutment 263 that can engage notches or teeth 243. The second end 264 may be downturned at an angle of about ninety degrees to provide a lip extending over adjuster base 250 and hold the detent spring in place.

Having described a preferred embodiment, it will become apparent that various modifications can be made without departing from the scope of the invention as defined in the accompanying claims.

The invention claimed is:

1. An adjustment mechanism for reel-to-bedknife clearance, comprising:
   a rotatable adjustment knob having a plurality of radially directed notches;
   a rod having a first end connected to the adjustment knob;
   an adjuster base through which the rod extends, the adjuster base having a slot in a face thereof over the rotational axis of the adjustment knob;
   a detent spring mounted within and held stationary in the slot and having a first upturned end with a ridge that engages the notches at a plurality of different reel-to-bedknife clearance positions and a second downturned end that extends away from the face of the adiuster base, the detent spring resisting rotation of the adjustment knob that holds the detent spring in place in the slot.

2. The adjustment mechanism of claim 1 wherein the rod extends through an opening in the detent spring without being secured to the detent spring.

3. The adjustment mechanism of claim 1 further comprising a coil spring around the rod.

4. The adjustment mechanism of claim 1 wherein the rod has a second end pivotally connected to the reel.

5. The adjustment mechanism of claim 1 wherein the rod has a second end pivotally connected to the bedknife.

6. The adjustment mechanism of claim 1 wherein the detent spring is captured between the adjustment knob and the adjuster base.

7. An adjustment mechanism for reel-to-bedknife clearance, comprising:
   an adjuster base having an internal bore;
   an adjustment knob attached to a rod extending through the internal bore to engage one of the reel or bedknife;
   a detent spring captured between the adjuster base and the adjustment knob and biased against the adjustment member to resist rotation of the adjustment knob; the detent spring held between the adjuster base and the adjustment knob without any other fastener; the detent spring having a first upturned end with a ridge that engages the adjustment knob at a plurality of rotational positions and a second downturned end that extends down from the adjuster base;
   a slot on top of the adjuster base transverse to the rod, the detent spring held in the slot by the adjustment knob and resisting rotation of the adjustment knob.

8. The adjustment mechanism of claim 7 further comprising a plurality of radial notches on the adjustment knob that are engaged by the detent spring.

9. The adjustment mechanism of claim 7 further comprising a coil spring around the rod between the adjuster base and one of the reel or bedknife.

10. The adjustment mechanism of claim 7 wherein the rod extends through an opening in the detent spring without being secured to the detent spring.

11. The adjustment mechanism of claim 7 wherein the rod extends through a tube positioned on the reel transversely to the rod.

12. An adjustment mechanism for reel-to-bedknife clearance, comprising:
   a bedknife having a cutting edge adjacent a rotating cutting reel having a plurality of cutting blades;
   an adjustment knob connected by a rod to one of the bedknife and the cutting reel; the adjustment knob rotatable to vary the clearance between the bedknife and cutting blades; and
   a detent spring having an opening through which the rod extends and biasing the adjustment knob to a secured position at any of a plurality of reel-to-bedknife clearance positions; the detent spring having a first upturned end with a ridge that engages the adjustment knob at any of the plurality of reel-to-bedknife clearance positions and a second downturned end that extends down and away from the adjustment knob; the detent spring held in place in a slot transverse to the rod by only the adjustment knob that the detent spring restricts from rotation and without any other fastener.

13. The adjustment mechanism of claim 12 further comprising an adjuster base through which the rod extends.

14. The adjustment mechanism of claim 13 further comprising a slot in the face of the adjuster base.

15. The adjustment mechanism of claim 14 wherein the detent spring fits within the slot in the adjuster base.

16. The adjustment mechanism of claim 13 wherein the detent spring is captured between the adjustment knob and the adjuster base.

17. The adjustment mechanism of claim 12 further comprising a plurality of radially outwardly extending notches from the adjustment knob.

18. The adjustment mechanism of claim 17 wherein the detent spring includes a ridge that engages the radially outwardly extending notches at each reel-to-bedknife clearance position.

\* \* \* \* \*